United States Patent
Goebels

(10) Patent No.: US 7,137,674 B2
(45) Date of Patent: Nov. 21, 2006

(54) REVERSE DRIVING SIGNAL

(75) Inventor: Hermann J. Goebels, Sheffield Village, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/837,990

(22) Filed: May 3, 2004

(65) Prior Publication Data
US 2005/0242665 A1    Nov. 3, 2005

(51) Int. Cl.
*B60T 8/32* (2006.01)

(52) U.S. Cl. ............... 303/191; 303/123; 303/199; 188/1.11 R; 188/1.11 E

(58) Field of Classification Search ........... 303/191, 303/123, 199; 340/453, 431, 426.32; 188/1.11 R, 188/1.11 E
See application file for complete search history.

(56) References Cited

U.S. PATENT DOCUMENTS

| 6,404,188 B1 | 6/2002 | Ricks |
| 6,459,261 B1 | 10/2002 | Luetzow et al. |
| 2002/0005780 A1* | 1/2002 | Ehrlich et al. .............. 340/453 |

* cited by examiner

*Primary Examiner*—Xuan Lan Nguyen
(74) *Attorney, Agent, or Firm*—Calfee, Halter & Griswold LLP

(57) ABSTRACT

A method of generating a reverse driving signal for a vehicle includes the step of activating an actuator, such as a vehicle stop light switch, a predetermined number of times within a predetermined period of time. A braking system for a vehicle includes an actuator, such as a stop light switch that is actuatable to provide a reverse driving signal indicative of brake pedal operation, an ECU that is electrically connected with the actuator for receiving the reverse driving signal, and a vehicle accessory, such as a back-up alarm, that is electrically connected with the ECU, the ECU being controlled as a function of the reverse driving signal.

5 Claims, 2 Drawing Sheets

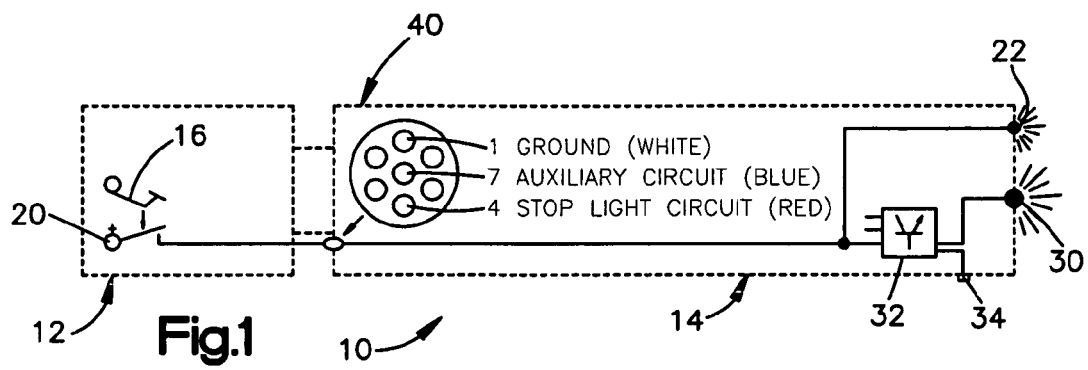
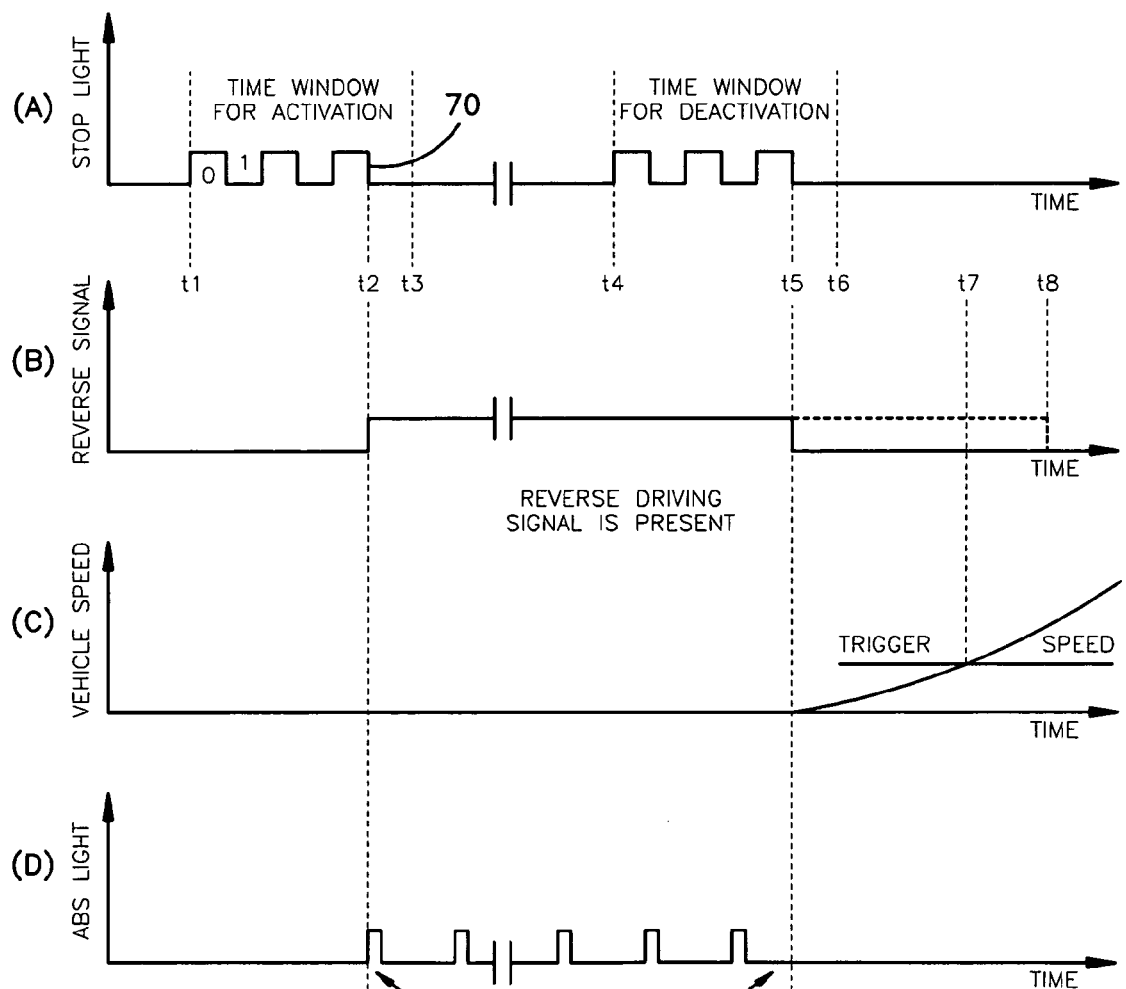

REVERSE DRIVING SIGNAL

BACKGROUND OF THE INVENTION

1. Technical Field

The present invention relates to a reverse driving signal for a vehicle, such as a tractor-trailer. In particular, the present invention relates to a reverse driving signal that can be used for, for example, to activate a back-up light or back-up alarm or any other accessory that is to be turned on or off during or before reverse driving of the vehicle.

2. Description of the Prior Art

Backing a vehicle can potentially be hazardous especially when backing with a trailer and when visibility behind the trailer is poor. It is known to provide a back-up light or back-up alarm that is activated while backing up, to warn pedestrians to be alert when crossing behind the trailer.

It is known to generate a reverse driving signal in either the tractor or the trailer. In the tractor, the reverse driving signal is typically generated by a simple electrical switch that is closed when the transmission is put in reverse. A tractor generated reverse driving signal requires a hard wire connection to the trailer to transmit the reverse driving signal to the back end of the trailer where the back-up light or alarm is located. The hard wire for transmitting the reverse driving signal to the trailer may alternatively be part of a second connector between the tractor and trailer, or the signal may alternatively be transmitted via a communication link, e.g., Power Line Communication (PLC) over an existing wire in the seven-conductor electrical connector jumper cable (according to SAE J 560) as is currently used in some new tractor/trailers. A second connector is expensive and must be installed both on the tractor and on the trailer. That limits the flexibility of use a trailer with different tractors and of a tractor with different trailers. Therefore a second connector is used only in a very low number of special tractor/trailer combinations. To transmit the tractor generated reverse driving signal to the trailer via a communication link requires also the availability of such a communication link in both tractor and trailer. Many trailers built before Mar. 1, 2001 do not have PLC and will be in use yet for many more years after that date. Therefore a communication link is also a limited option.

A trailer generated reverse driving signal is typically provided by an electronic sensor, e.g., a Hall-effect sensor, that is associated with a rotatable road wheel of the trailer. This type of sensor is relatively expensive, requires a protected and clean environment, and can detect reverse driving only when the trailer is in motion.

SUMMARY

The present invention relates to a method of generating a reverse driving signal for a vehicle, including the step of activating a vehicle actuator, such as a stop light switch, a predetermined number of times within a predetermined period of time.

The present invention also relates to a method comprising the steps of activating an actuator a predetermined number of times greater than one within a predetermined period of time, and in response to the activating step, activating a vehicle function.

The present invention also relates to a method comprising the steps of receiving a first signal from an actuator of a vehicle, comparing the received first signal to a set of stored conditions, and in response to the comparison, providing a second signal to a vehicle device.

The present invention also relates to a braking system for a vehicle, comprising an actuator, such as a stop light switch, that is actuatable to provide a reverse driving signal, an ECU that is electrically connected with the actuator for receiving the reverse driving signal, and a back-up alarm or other accessory that is electrically connected with the ECU, the ECU being controlled as a function of the reverse driving signal received from the actuator.

The present invention also relates to apparatus comprising means for receiving a signal from an actuator of a vehicle, means for comparing the received signal to a set of stored conditions, and means for providing electrically an activation signal in response to the means for comparing.

BRIEF DESCRIPTION OF THE DRAWINGS

FIG. 1 is a schematic illustration of a tractor-trailer combination embodying the present invention;

FIG. 2 is a graphical illustration that compares stop light switch position, reverse driving signal activation, vehicle speed, and ABS light status.

DETAILED DESCRIPTION OF THE INVENTION

Figure 3:
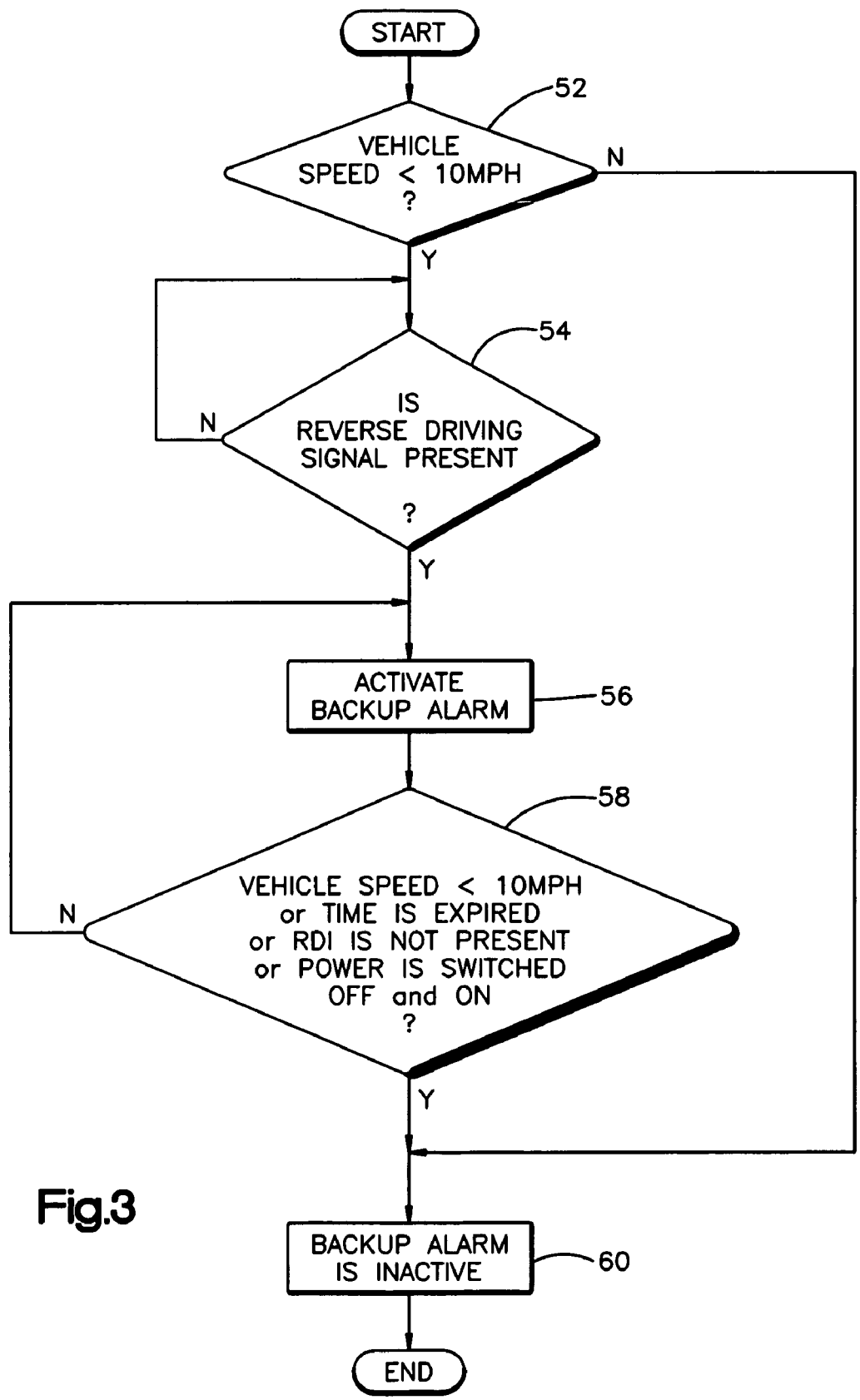
FIG. 3 is a flow chart illustrating the activation and deactivation of the reverse driving signal.

The invention is illustrated in a first embodiment with respect to a tractor-trailer combination 10, but is applicable to other types of vehicles, for example, a straight truck or a bus. The tractor-trailer combination 10 includes a tractor 12 and a trailer 14.

The tractor 12 includes the vehicle brake pedal, which is shown schematically at 16. Associated with the brake pedal 16 is a stop light switch 20. The stop light switch 20 is electrically connected to a positive power source that is used to illuminate the stoplights in the tractor 12 and trailer 14 when in a closed position.

Depressing or pushing the brake pedal 16 causes activation (closing) of the stop light switch 20. The switch 20 is in a closed position as soon as the driver applies the brake pedal 16 and at no more than 6 psi brake pressure applied to the brake chambers. Releasing the brake pedal 16 causes the stop light switch 20 to be opened. The switch 20 is in an open position when the brake pressure is released. When the switch 20 is opened and closed, its output signal changes state as shown schematically in FIG. 2.

The stop light switch 20 is thus a device that functions to electrically provide an indication of driver brake pedal operation. In this regard, the function of the stop light switch can be provided with other types of devices, such as a pressure switch, a pressure sensor, a position indicator, etc.—any actuator that provides a signal indicative of brake pedal operation. This device can be located anywhere in the vehicle braking system—at the brake pedal, in an air line, etc.

The trailer 14 has one or more stop lights shown schematically at 22. The trailer has an electrically operated accessory which in the illustrated embodiment is a back-up alarm or indicator, shown schematically at 30, which is preferably an audible alarm. The trailer 14 also has an electronic control unit (ECU) 32, which may be a microprocessor. The ECU 32 may the trailer's ABS ECU, or may be a separate ECU. The ECU 32 is programmed to receive a signal from the stop light switch, compare it to a set of conditions stored in memory, and from that comparison make a determination as to whether the reverse driving signal has been provided. When the ECU 32 recognizes the presence of the reverse driving signal, it might a signal to close a switch or relay for activation of the alarm 30. Alternatively, the ECU 32 might itself directly control the alarm 32.

Each trailer with ABS has an external ABS light 34 mounted on the left rear side of the trailer such that the driver can see the ABS light status in the driver's mirror. The ABS light 34 is required to indicate the actual status of the ABS system. The ABS light 34 remains on whenever a failure in the ABS system is present and is not on when no failure is detected. In one embodiment of the invention, as described below, the ABS light 34 is used to indicate to the driver an activated status of the back-up alarm 30.

The vehicle 10 includes a wired connection 40 between the tractor 12 and the trailer 14. In the illustrated embodiment, the wired connection 40 includes a standard SAE J560 seven pin connector. By this connection 40, electrical power is supplied to the trailer ECU 34 via pin 7 the auxiliary circuit (blue wire), the trailer stop lights 22 via pin 4 the stop light circuit (red wire), and a ground connection on pin 1 (white wire). The positive power on pin 7 is present as soon as the tractor ignition switch is turned on. The positive power at pin the stop light switch connection at pin 4 is present only when brake pressure is applied by the driver. By this connection 40 also, a signal that is indicative of the state of the stop light switch 20 is transmitted to the trailer 14 and to the trailer ABS ECU 32. If both the tractor 12 and the trailer 14 have an active Power Line communication (PLC) link, then the reverse driving signal can be transmitted to the trailer via this link.

In the illustrated embodiment, a reverse driving signal is selectively provided to the trailer ECU 32 by the vehicle operator, from the vehicle tractor 12. In the preferred embodiment, the reverse driving signal is a pattern of electrical impulses generated by tapping the brake pedal 16 a predetermined number of times within a predetermined period. In the preferred embodiment, the ECU 32 is programmed to recognize the negative flank of the stop light signal—that is, the end of the signal when the brake pedal 16 is released.

The stop light switch 20 in these vehicles is by law activated at no more than 6 psi of air pressure when the brake pedal 16 is depressed. This amount of pressure is provided when the brake pedal 16 is just touched. Therefore, the vehicle's service brakes are not necessarily applied, per se; rather, the brake pedal 16 need only be lightly touched.

In the most preferred embodiment, the reverse driving signal is a pattern of electrical impulses generated by tapping the brake pedal 16 three times within a two second period.

The pattern of activations of the brake pedal 16 could be different. For example, there could be a different number of taps, or a series of taps over a different time period. Alternatively, the ECU 32 could be programmed to recognize the duration of individual applications of the brake pedal 16, or the time period between them (as in a Morse code system, for example). Preferably, any combination or sequence of brake pedal applications that does not occur in normal driving or braking activity, can be used.

The pattern of three taps is chosen as the preferred embodiment because it is believed to be a relatively unusual occurrence in normal driving. The closer the pattern is to a normal occurrence (for example, two taps rather than three), the greater the risk of unintentional activation.

This reverse driving signal can be provided also when the vehicle parking brake is on. Parking brakes for this class of vehicle are typically spring brakes that are controlled by a different air pressure line than the service brakes. Thus, the service brake is unaffected by the use of the parking brakes, and is available for providing the reverse driving signal in accordance with the present invention. This is beneficial when the vehicle is being parked or when the parking brake is being used to hold the vehicle on a hill.

For example, if the vehicle 10 is on a hill headed "uphill", and the driver needs to back down the hill, the vehicle has enough inertia that the brake pedal 16 can be tapped the required number of times (and the reverse driving signal provided) before the vehicle starts moving a significant amount. Thus, a reverse driving signal can be provided, activating the back-up alarm 30, even in an uphill or downhill parking situation, with or without the parking brakes on.

The ECU 32 is programmed to look at other factors and compare inputs to conditions stored in memory in deciding whether to provide an activation signal. For example, the back-up alarm 30 is, preferably, activated only if the vehicle speed is zero or less than 10 miles per hour. The back-up alarm 30 is, preferably, deactivated if the vehicle speed exceeds 10 mph.

The back-up alarm 30 is, preferably, deactivated after a predetermined period of time, for example, one minute. Also, the back-up alarm 30 is, preferably, deactivated if the vehicle power is turned off and back on.

The back-up alarm 30 is, preferably, deactivated when the same reverse driving signal (pattern of stop light switch on and off cycles) is received by the ECU 32. Thus, the alarm 30 can be turned both on and off by the same signal.

The ABS status light 34 is used as an indicator to the driver of the active status of the back-up alarm 30. Another indicator could, alternatively, be used. The active status of the back-up alarm 30 is signaled via the ABS light 34 with slowly repeated blinks, a pattern that is not present in other usage of the ABS light 34. This special blink mode, using a relatively short illumination time (about 100 milliseconds) and longer pauses (illuminations about one second apart) is easily detectable by the driver, and is different from a normal turn signal, to prevent misinterpretation of the signal as a turn signal by other traffic.

If both the tractor 12 and the trailer 14 have an active Power Line Communication (PLC) link, then the back-up alarm status can be transmitted to the tractor via this link, to notify the driver. PLC, when present, is already used to control the in-cab light indicative of trailer ABS status.

FIG. 3 is a flow chart of one embodiment of the process. The process of activating and deactivating the back-up alarm 30 starts at Step 52 at which the vehicle speed is checked by the ECU to determine whether it is less than or equal to a predetermined speed, for example, 10 mph.

If the vehicle speed is determined at Step 52 to be not less than or equal to the predetermined speed, the back-up alarm 30 (for example, an audible alarm or a light) is maintained in an inactive state.

If the vehicle speed is determined at Step 52 to be less than or equal to the predetermined speed, the process continues to step 54, at which the ECU 32 determines whether the reverse driving signal (for example, the stop light switch activation as described above) is present.

If the reverse driving signal is determined at Step 54 to be present, the process continues to Step 56, at which the ECU 32 provides an alarm activation signal to the back-up alarm 30 and the back-up alarm is activated.

On the other hand, if the reverse driving signal is determined at Step 54 not to be present, the process loops back and periodically or continually makes the same determination.

When the back-up alarm 30 is active as at Step 56, the process continues by checking periodically or continually at Step 58 for indications or conditions that the back-up alarm should be deactivated. Such conditions could include, for example, the vehicle speed equaling or exceeding 10 mph; electrical power to the trailer 14 being switched off and then back on; expiration of a predetermined period of time; or a deactivation signal, as described above, which may be, for example, repeating of the reverse driving signal while the back-up alarm 30 is already activated.

If none of these conditions is found to be present, then the back-up alarm 30 is maintained at Step 56 in an active condition. If any one or more of these conditions is found to be present, then the process continues to step 60, at which the back-up alarm 30 is placed in an inactive state.

FIG. 2 is a graphical illustration of operation of the system of the present invention. Line A represents the state of the stop light switch 20. When line A is down, the switch 26 is open. When the operator presses the brake pedal 16, the switch 20 is closed. When the operator thereafter releases the brake pedal 16, the switch 20 opens again, with a downward flank as shown at 70.

Line B represents the state of the reverse driving signal. Line C represents vehicle speed. Line D represents the status of the ABS indicator light 34 on the trailer 14.

It can be seen that the reverse driving signal is not activated until the stop light switch 20 is closed and opened in the required manner. When that occurs, as indicated at time t2, the reverse driving signal is activated, as can be seen from Line B.

At time t4 the driver begins the deactivation process by commencing the same pattern of brake pedal applications. This pattern does not complete, however, until time t5, at which time the reverse driving signal is no longer present and the back-up alarm 30 is deactivated.

As seen from line C, when the vehicle speed reaches a predetermined trigger speed, the alarm 30 is automatically deactivated. As seen from Line D, the ABS light 34 is active, flashing periodically, only when the reverse driving signal is active.

The back-up alarm system can be implemented using hardware that already exists in practically all relevant vehicles. The vehicle should preferably have an ABS ECU or other device capable of receiving the stoplight signal and using it to make a determination as to activating the back-up alarm 30. Software changes may be needed to the ECU to store the various factors and values used in making the determination of whether to activate the back-up alarm 30.

The system is simple, easy to use, and low in cost. The reverse driving signal is transmitted from the tractor 12 to the trailer 14 using the existing stop light circuitry, which is also the second power source for all trailer ABS ECUs. The back-up alarm status can be transmitted via PLC and displayed by a warning lamp on the tractor dashboard if a power line communication link is present in the tractor and the trailer.

From the above description of the invention, those skilled in the art will perceive improvements, changes, and modifications in the invention. For example, the back-up alarm is just one example of a possible use of the reverse driving indication. Other possible uses (accessories, or vehicle functions) include back-up lights, flood lamps, a camera, or locking of a self-steered axle. A self-steer mechanism functions only in forward driving situations. In reverse the self-steer axle must be lifted or locked by an air cylinder with a mechanical linkage in the straight-ahead position. Without locking of the axle the wheels will bend immediately to the maximum steering angle position that will cause dragged wheels with bad maneuverability and excessive tire wear. The present invention enables the provision of a reverse driving signal before backing starts. Thus, the axle can be lifted or locked before backing. As soon as the reverse driving signal is sent to the trailer ABS via the stop light circuit the ECU can energize a solenoid valve that feeds an air cylinder from an air tank to lift or lock the axle before backing. Also, other accessories as back-up lights or flood lights or a warning alarm or horn should be activated already shortly before backing. Instead of controlling these devices directly, the reverse driving signal could be also transmitted from the ABS ECU to another trailer-mounted ECU unit for further control functions. If a straight truck or bus is used, no trailer is present, and the invention is applicable within the truck or bus. Such improvements, changes, and modifications within the skill of the art are intended to be included within the scope of the appended claims.

Having described the invention, I claim:

1. A braking system for a vehicle, comprising:
an actuator that is actuatable to provide a reverse driving signal that is indicative of brake pedal operation;
an ECU that is electrically connected with the actuator for receiving the reverse driving signal; and
a vehicle accessory that is electrically connected with the ECU;
said ECU being controlled as a function of the reverse driving signal received from the actuator; and
further comprising a brake pedal that is driver operable to activate said actuator.

2. A braking system for a vehicle, comprising:
an actuator that is actuatable to provide a reverse driving signal that is indicative of brake pedal operation;
an ECU that is electrically connected with the actuator for receiving the reverse driving signal; and
a vehicle accessory that is electrically connected with the ECU;
said ECU being controlled as a function of the reverse driving signal received from the actuator; and
wherein the vehicle is a tractor-trailer combination, said ECU is in the trailer and receives the reverse driving signal to control stop lights in the trailer.

3. A braking system for a vehicle, comprising:
an actuator that is actuatable to provide a reverse driving signal that is indicative of brake pedal operation;
an ECU that is electrically connected with the actuator for receiving the reverse driving signal; and
a vehicle accessory that is electrically connected with the ECU;
said ECU being controlled as a function of the reverse driving signal received from the actuator; and
wherein the reverse driving signal is generated by activating the actuator a predetermined number of times within a predetermined period of time.

4. A system as set forth in claim 3 wherein the reverse driving signal is generated by activating the actuator three times within two seconds.

5. A braking system for a vehicle, comprising:
an actuator that is actuatable to provide a reverse driving signal that is indicative of brake pedal operation;

an ECU that is electrically connected with the actuator for receiving the reverse driving signal; and
a vehicle accessory that is electrically connected with the ECU;
said ECU being controlled as a function of the reverse driving signal received from the actuator; and
further comprising a brake pedal that is driver operable to activate said actuator;

wherein the vehicle is a tractor-trailer combination, said ECU is in the trailer and receives the reverse driving signal to control stop lights in the trailer; and
wherein the reverse driving signal is generated by activating the actuator three times within two seconds.

* * * * *